May 22, 1962     D. E. HOTTLE     3,035,863
AUTOMOBILE DOOR CONSTRUCTION
Original Filed Oct. 30, 1958     2 Sheets-Sheet 1
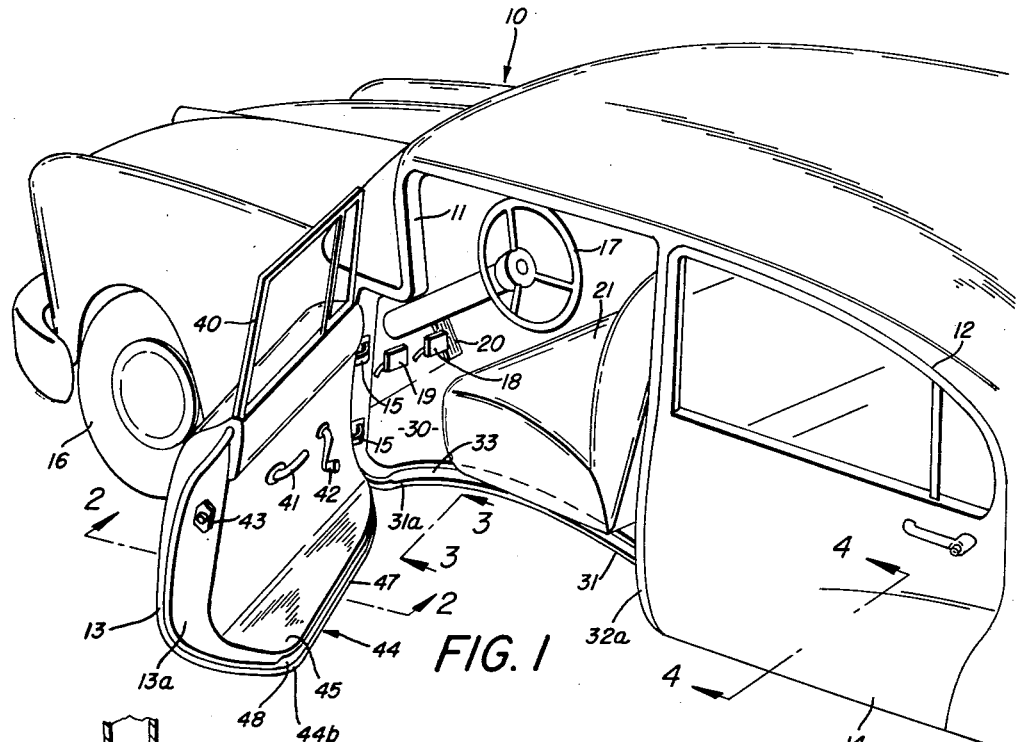
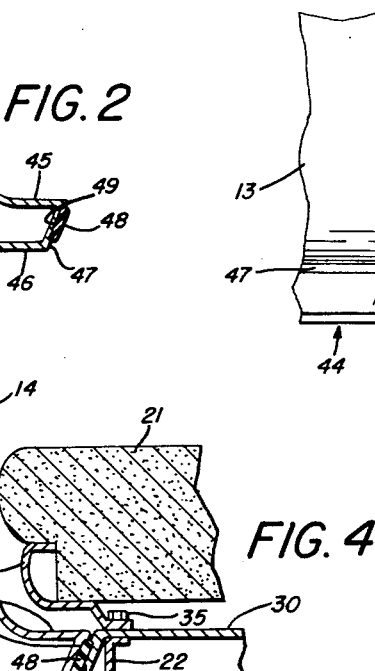
INVENTOR.
DWIGHT E. HOTTLE
BY
*[signature]*
ATTORNEY May 22, 1962 D. E. HOTTLE 3,035,863
AUTOMOBILE DOOR CONSTRUCTION
Original Filed Oct. 30, 1958 2 Sheets-Sheet 2
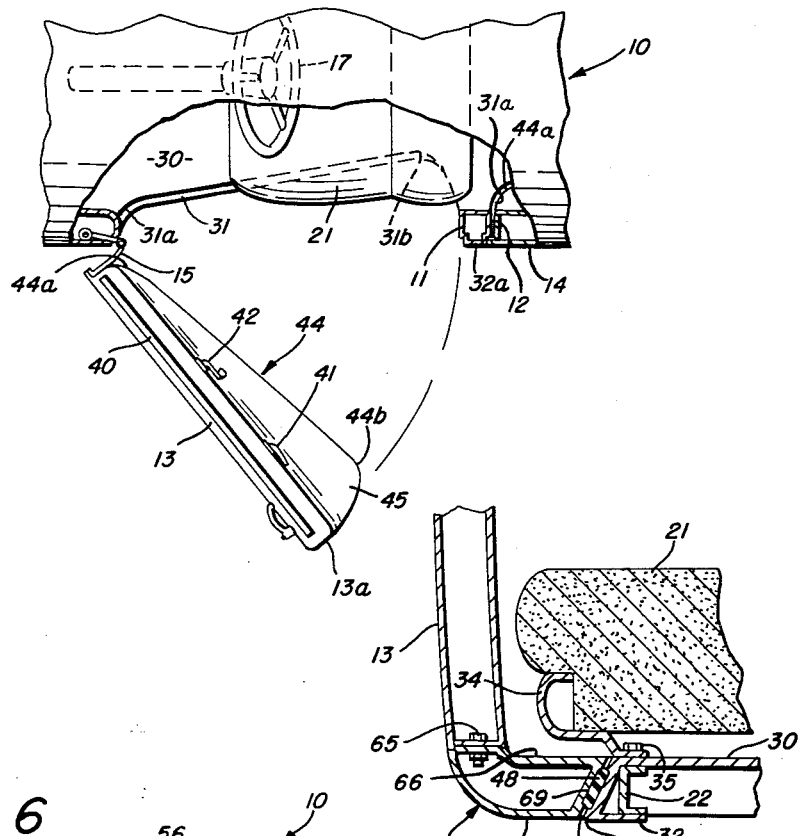
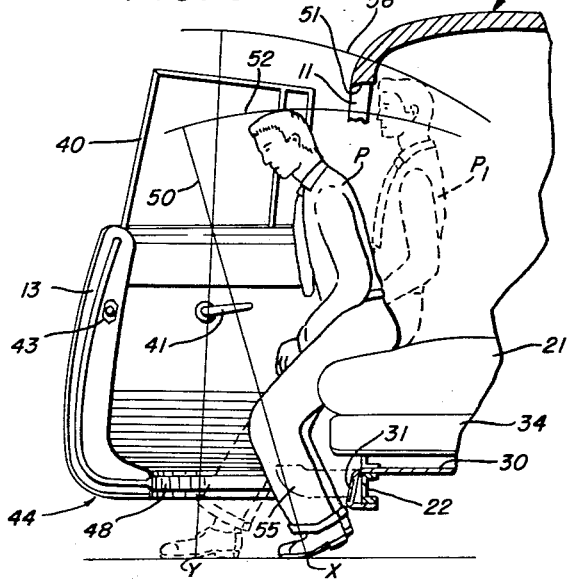
INVENTOR.
DWIGHT E. HOTTLE
BY
ATTORNEY 3,035,863
AUTOMOBILE DOOR CONSTRUCTION
Dwight E. Hottle, 2866 Lakeland Parkway,
Cuyahoga Falls, Ohio
Continuation of application Ser. No. 770,623, Oct. 30, 1958. This application Jan. 15, 1962, Ser. No. 168,571
5 Claims. (Cl. 296—44)

This invention relates to the art of automobile body construction and in particular has reference to improvements in automobile doors that improve passenger ingress and egress.

In recent years, automotive styling advances have resulted in a progressive lowering of the roof line of the automobile body, with public taste dictating such low silhouette-type of body construction for safety and appearance reasons.

While such advances have enhanced the styling appeal of the automobiles, the same have also had the disadvantage of making the interior of the car more difficult to enter or leave, as the case may be, due to the fact that the overall height of the door opening has been materially reduced. Consequently, people entering low-silhouette type of cars of such design are compelled to bend over and enter the car in a somewhat stooped position to avoid striking of the head against the roof portion of the door opening.

By way of background for the invention herein disclosed, it should be further noted in connection with automobile body construction, that the conventional door opening of an automobile body is generally disposed in a vertical plane, with the roof and floor areas of the body terminating in a door opening that is disposed in an approximately common vertical plane.

In basic essence, the discovery of the present invention teaches the cutting out of a portion of the floor area in the region of the car door and projects therefrom at substantially right angles. In this manner, upon closure of the door, the flange portion thereof will fill the void in the floor area and form a portion of the interior floor surface of the automobile body.

As a result of this feature, when the car door is swung open, a passenger will be enabled to place his or her legs within the cut out portion so as to commence ingress or egress from the automobile by placing the feet on the ground (FIGURE 6) at a point that is closer to the longitudinal center line of the car than was heretofor possible.

From the standpoint of ingress or entering of the car, the above construction will permit a passenger to actually enter the car in a less crouched position than would be the case if the floor area were not recessed or cut out. This is due to the fact that when the door is open the passenger must be crouched only to the extent necessary to clear the roof area of the door opening with his or her feet on the ground. By way of contrast, when the floor area is not recessed, as is the case in conventional prior art construction, the passenger must make initial entry in a more crouched position so as to clear the roof area of the door opening when the feet are positioned on the floor of the automobile.

Accordingly, the present invention enables the user to additionally utilize the vertical distance between the ground and the floor area for the purpose of entering the automobile. It accordingly follows that from a standpoint of egress or leaving of the car, that the same situation of increased vertical space will exist.

As a further salient advantage of the present invention, a passenger leaving a car having a recessed floor area will have the further advantage of being enabled to position his or her feet "under the car" so that the knees are bent to a greater extent. In this manner, the leg muscles can be used to raise the body past the door opening instead of requiring the use of the arm muscles as is conventionally the case in the known prior art.

While the above construction has advantages in all types of automobile construction, it has been found that the advantages will be particularly noteworthy in the case of two-door types of automobiles that have a rear seat, since the occupant of the rear seat will be enabled to walk further into the back seat before actually assuming a seated position.

As a still further advantage of the above improvement, it has been found that automobile bodies constructed in accordance with the principles of this invention will have improved safety features due to the fact that there will be less likelihood of the door springing open during collision. Principally, this advantage results from the fact that any member is structurally strengthened by bending the same at right angles upon itself. Accordingly, since a right angle bend is provided between the door and the flange, it follows that the door itself becomes a more rigid member due to this type of construction. Additionally, it would appear manifest that since the flange and floor are disposed in a substantially common horizontal plane, that longitudinal distortion of the flange would result in binding of the same within the cut out area of the body, with the result that this binding between the floor and the flange would assist in retaining the door in closed position at all times.

It accordingly becomes the principal object of this invention to provide a new and improved type of automobile body that is characterized by the fact that the same includes a floor portion that is recessed and complementally sealed in turn by the flange of the movable door associated therewith, with the result that improved ingress and egress is provided for occupants of the automobile.

It is a still further object of this invention to provide an improved type of automobile body of the type above described that is characterized by the fact that improved safety is provided for the occupants due to the additional resistance to door opening that is provided by the improved construction These and other objects of the invention will become more apparent upon a reading of the following brief specification, considered and interpreted in the light of the accompanying drawings.

Of the drawings:

FIGURE 1 is a perspective view illustrating the improved automobile body invention.

FIGURES 2, 3 and 4 are vertical sections taken on the lines 2—2, 3—3 and 4—4 of FIGURE 1.

FIGURE 5 is a plan view, partially broken away and in section and showing the door in open position.

FIGURE 6 is a partial sectional view illustrating the advantages of the invention.

FIGURE 7 is a view similar to FIGURE 4 but illustrating a modified form of the invention.

Referring now to the drawings and in particular to FIGURE 1 thereof, the improved automobile body, generally designated by the numeral 10, is shown provided with contoured door openings 11 and 12, within which front and rear doors 13 and 14, respectively, may be seated upon movement thereof about hinges 15, 15.

The usual wheels 16, steering wheel 17, pedals 18, 19 and 20 and front seat 21 are also illustrated in FIGURE 1 of the drawings, with these items being conventional and operating in a similar fashion to that well understood in the prior art.

Turning now to a more detailed consideration of the body portion 10, it is first to be understood that the usual longitudinally extending frame members 22 are attached to and support the body 10 in known fashion, with the floor area 30 of body portion 10 being shown disposed over one such frame element 22 in FIGURES 3, 4, 6 and 7 of the drawings. Additionally, the floor area 30 is shown terminating in the region of door openings 11 and 12, in an edge surface 31 that, in turn, terminates in a return flange 32 that is received against the opposed edge of the frame 22 as best shown in FIGURES 3 and 4 of the drawings.

As has been indicated, the edge surface 31 defines the extent of the cut-out or recessed portion of floor 30 and accordingly, the same is shown contoured to form an arcuate opening in the floor area 30 (see FIGURE 5). In the preferred embodiment of the invention, it will be seen that the recess is somewhat wedge-shaped in plan, with the edge surface 31 tapering inwardly and rearwardly from a minimal point of traverse undercut 31a towards a maximum point of traverse undercut 31b, with edge portion 31 returning from point 31b to a point adjacent post 32 as is clearly shown in FIGURE 5 of the drawings. In this fashion, a point of maximum cut out area is provided forwardly of post 32, while a minimal cut out area is provided adjacent hinge 15.

For the purposes to be described, the face of edge surface 31 is further provided with an undercut 33 that coacts with certain components of door 13 as will hereinafter be described.

Additionally, and for environmental purposes, seat frame 34 is shown secured to floor 30, as by bolt 35, for the purpose of positioning seat 21, it being understood that the shiftable mounting of seat 21 with respect to frame 34 is accomplished in the manner well understood in the prior art.

Turning now to a consideration of the door member 13, it will first be understood that the same includes the usual window 40, operating handles 41 and 42, and latching mechanism 43. In addition to the aforementioned component parts, the lower edge portion of each door 12 and 13 is provided with a substantially right angle flange portion that is indicated generally by the numeral 44 in the drawings. The flange 44 includes opposed planar surfaces 45 and 46 that are interconnected by an edge surface 47; the arrangement being such that the surfaces 45, 46 and 47 will be disposed, upon closing door 12, in substantially coplanar relationship with the surfaces 30, 32 and 31, respectively, of body 10. A gasket or resilient sealing means 48 is shown secured within an undercut 49 that is provided on planar surfaces of edge 47, with sealing member 48 being received in groove 33 when the door is closed, as shown in FIGURE 4. In this fashion, the surface 45 of flange 44 will form a portion of the interior floor area of the automobile during the period that the same is closed.

For the purpose of permitting the flange 44 to be received in the opening defined by edge surface 31, the planar outline configuration of the flange 44 is such that the same has its minimum point of projection 44a disposed adjacent hinge 14, while the maximum point of projection 44b thereof is disposed adjacent the distal edge 13a of door 13 (see FIGURES 1 and 5). In this fashion, the edge 47 will be complemental in planar outline and width to the planar outline and width of edge 31 so that upon closing of the door, the sealing means 48 will render the body tight to atmosphere.

In this regard, the preferred embodiment of the invention preferably contemplates that the surface 31 and 47 be slightly inclined with respect to vertical, with the degree of inclination preferably being substantially equal so as to permit the sealing of the door edge 47 against surface 31 as has been described.

With regard to the use or operation of the improved automobile body, it will first be assumed that an automobile body has been constructed in accordance with the above teachings and, accordingly, reference will now be had at this point to FIGURE 6 for the purpose of explaining the operation of the invention.

In this regard, FIGURE 6 illustrates in full lines the improved automobile body, while the chain dotted line portions thereof represent the body construction and occupant's position as taught by the prior art. Accordingly, and referring to FIGURE 6, it will be noted from the full lines that the occupant P about to leave the automobile, can position his feet at a point X on the ground with the leg portions of the occupant accordingly being disposed along the line 50 of FIGURE 6, with the knees being bent at approximately right angles. In this position, a slight leaning forward to the full line position shown will cause the head portion of the occupant to clear the roof area 51 of door opening 11, with the occupant's head moving along the arcuate path 52. When the full line position has been reached, it is believed obvious that the proper crouch will have been attained to permit the occupant to assume an upright position merely by utilizing the leg muscles to raise the hips off of seat 21 and thus easily emerge from the car, without the use of the hands.

By way of contrast, the feet of occupant P1, upon leaving the car (shown in chain-dotted lines) will have to be placed on the ground at a point Y due to the fact that the legs must clear the floor portion 55 (chain-dotted lines) that is normally provided in conventional automobile bodies. At this point, the knees of occupant P1 will not be bent to the extent required to stand up, with the result that the arms will have to be employed to lift the hips off of seat 21. Also during each lifting, the head would move along line 56, with the result that the occupant must additionally bend the head during egress to avoid striking the roof area 51. It is believed apparent that because of the relative position of the respective occupants' legs, the occupant P1 will have to effectuate such lifting by use of the arms, while occupant P can employ the leg muscles alone to effectuate the attainment of an upright position.

With regard to the reverse of the above procedure wherein the occupant is entering the car, it is believed apparent that improved accessibility will be provided due to the fact that once again the feet of the occupant can be positioned transversely inwardly of the roof opening 51, with the result that the occupant can "enter" the car in a less crouched position than would be possible if the floor was not cut out as herein taught.

The modified form of the invention shown in FIGURE 7 is similar in all respects to that previously described, with the exception that the same is intended for use in modifying existing automobile construction to achieve the improved ingress and egress features of the invention. Accordingly, the floor area 30 of the automobile is cut out as before to define the contoured edge 31 and the lower portion of door 13 is cut off and a substantially normal flange 64 is bolted thereto as by use of one or more bolts 65, 65. As before, flange 84 has opposed planar surfaces 66 and 67 that are interconnected by an edge surface 68 much in the same manner as was the case in connection with the form of the invention shown in FIGURES 1 through 6. Seal 48 is positioned in undercut 69 for sealing purposes, with it being understood that surface 66 is disposed in substantially coplanar relationship with surface 30 for the purpose of providing additional interior floor area.

Also contemplated by the present invention is the provision of mechanical locking elements that would mechanically interlock the flange edge with the edge of the floor cut-out so as to provide auxiliary locking means that would give added insurance against door opening during collision. By like token, it also follows that the invention contemplates the forming of the frame members 22 to permit enlargement of the cut-out area if desired.

While a full and complete disclosure of the invention has been set forth in accordance with the dictates of the patent statutes, it is not intended that the invention be so limited.

Accordingly, modifications of the invention, including projection of interlocking means between the edge surfaces of door and body in the floor region, may be resorted to without departing from the spirit hereof or the scope of the appended claims.

This application is a continuation of applicant's application Serial No. 770,623, filed October 30, 1958, now forfeited.

What is claimed is:

1. An automobile body of the character described, comprising; a main body section including opposed sides and an interior floor surface; said floor having opposed edges that interconnect with said sides; at least one door hinged to the edge of an opening in at least one side and having a distal edge that closes against an opposed edge of said side opening; said edge of said floor surface adjacent said door in closed position being transversely offset towards the longitudinal center line of said body and defining a localized opening in said floor surface; and a flange projecting from the bottom edge of said door and extending transversely thereof; said flange having a planar outline that is complemental to the planar outline of said localized opening, whereby said flange may be positioned in said localized opening upon closure of said door with the projecting edges of said flange abutting said tapering surfaces of said localized opening; said flange having a substantial surface area thereof that is coplanar with said interior floor surface of said body; whereby said substantial surface area of said flange increases the useable interior floor surface of said body.

2. The device of claim 1 further characterized by the fact that the projecting edge of said flange is curved in planar outline.

3. The device of claim 1 further characterized by the fact that the extent of projection of said flange beyond said door is varied transversely of said door.

4. An automobile body of the character described, comprising; a main body section including opposed sides and an interior floor surface; said floor having opposed edges that interconnect with said sides; a door hinged to the edge of a door opening in one side and having a distal edge that closes against an opposed edge of said side opening; said edge of said floor surface adjacent said door in closed position being transversely offset towards the longitudinal center line of said body; a seat supported on and extending transversely of said floor surface and having an edge portion disposed adjacent said door in closed position; said seat edges being disposed further from the longitudinal center line of said body than at least a portion of said offset floor edge; and a flange projecting from the bottom edge of said door and extending transversely thereof; said flange having a planar outline that is complemental to the planar outline of said offset, whereby said flange may be positioned in said offset upon closure of said door with the projecting edges of said flange abutting said offset edge portion of said floor.

5. An automobile body of the character described, comprising; a main body section including opposed sides and an interior floor surface; said floor having opposed edges that interconnect with said sides; a door hinged to the edge of a door opening in one side and having a distal edge that closes against an opposed edge of said side opening; said edge of said floor surface tapering transversely inwardly from the edge portions thereof that are disposed adjacent the edge and distal portions of said door, with said tapering edge surfaces defining a localized opening in said floor adjacent said door; a seat supported on and extending transversely of said floor surface and having an edge portion disposed adjacent said localized opening; and a flange projecting from the bottom edge of said door and extending transversely thereof; said flange having a planar outline that is complemental to the planar outline of said localized opening, whereby said flange may be positioned in said localized opening upon closure of said door, with the projecting edge of said flange abutting the tapering edge surface of said localized opening.

No references cited.